Jan. 5, 1937.   R. F. O'MARA   2,066,418
SLUDGE DISPOSAL PLANT
Filed June 12, 1934
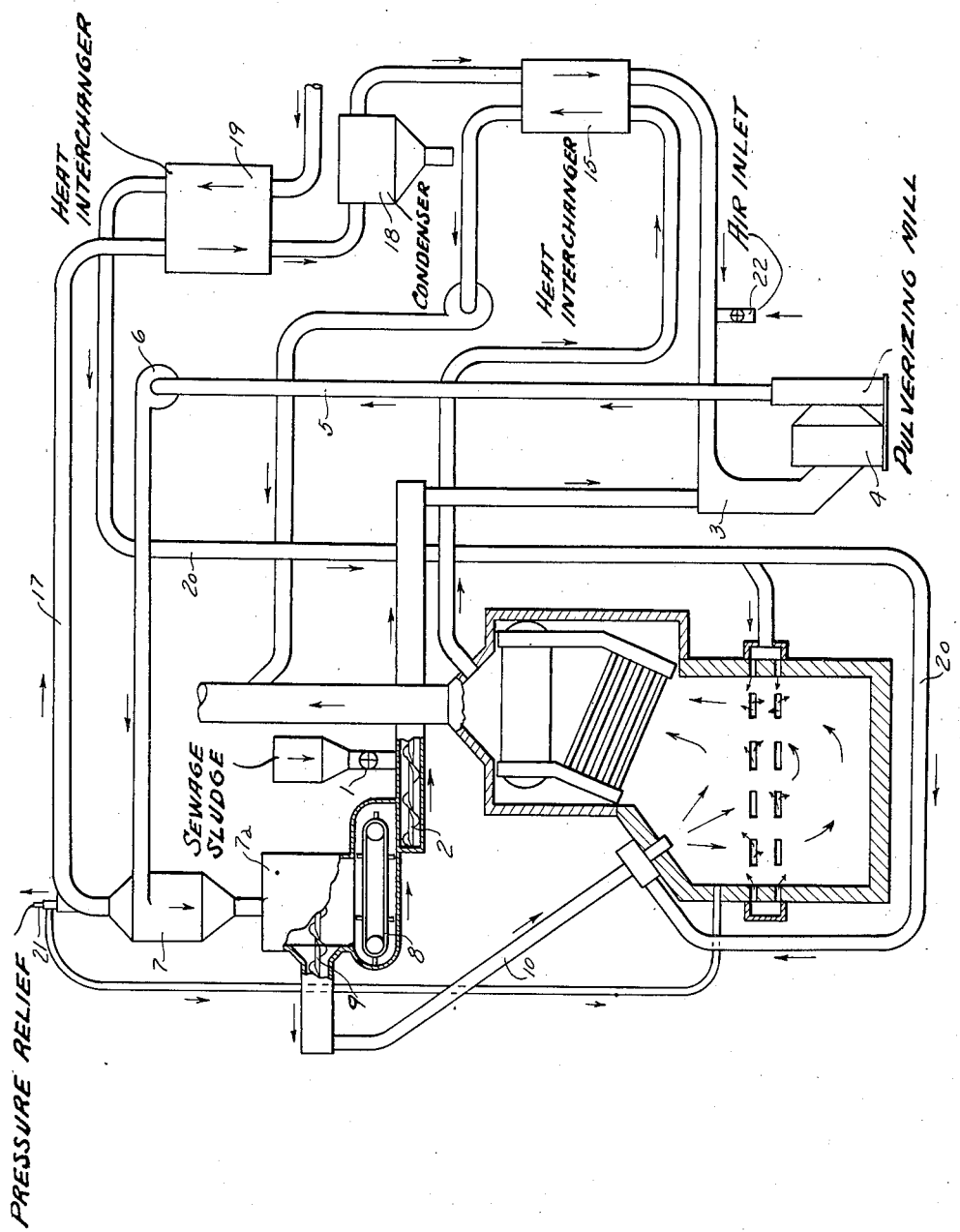
INVENTOR
RICHARD F. O'MARA.
BY O. V. Thiess
ATTORNEY Patented Jan. 5, 1937

2,066,418

UNITED STATES PATENT OFFICE 2,066,418

SLUDGE DISPOSAL PLANT

Richard F. O'Mara, Chicago, Ill., assignor to Raymond Bros. Impact Pulverizer Co., Chicago, Ill.

Application June 12, 1934, Serial No. 730,269

3 Claims. (Cl. 110—15)

The present invention relates to means for disposing by combustion of waste materials, such as sewage sludge, which are high in moisture content. In describing the invention sewage sludge will be used as an illustration, but it will be understood that this is not to be taken as limiting the invention to this material.

When it is attempted to burn such materials, and particularly sludge, on a grate, difficulty is experienced because of the low melting point of the ash; and the most satisfactory means so far found for burning them has therefore been to burn them in pulverized form in suspension in a furnace. This implies a previous drying and pulverizing. It is old in this art to dry the material by bringing it into contact, preferably before and during the grinding process, with heated air of other hot gases, and then to pass this air or gas into the furnace. The large amounts of moisture however with which the air or gas becomes charged while in contact with the sludge makes this undesirable if not prohibitive. This excessive moisture upsets combustion conditions, which are none too favorable in such a furnace, and increases corrosion of iron parts in the furnace and beyond. The moisture discharged into the furnace absorbs heat as its temperature is raised and this, in addition to the dilution of the air which it causes, makes necessary a high excess of air for complete combustion.

The discharge of the moisture-laden drying air or other gas to atmosphere instead of into the furnace is usually inadmissible. Plants of this sort are commonly located at river mouths, the sewers naturally following the slope of the land and discharging into lakes or into other rivers. The moisture in the gases will, on discharge to atmosphere under certain atmospheric conditions cause fogs which have been found objectionable to shipping interests. And even where no such basis for objection exists, the cloud of vapor calls attention to the presence of the plant and reacts unfavorably on property values.

It is one of the objects of the present invention to present a method and apparatus for sludge treatment obviating the discharge of the moisture evaporated from the sludge either into the air or into the furnace.

In the practice of my invention I utilize two interlocked closed circuits, in one of which the heating medium is circulated and in the other of which the material under treatment is circulated; and this peculiarity is a further feature of the invention.

Other and more detailed features of the invention will appear from the following description.

The invention is illustrated more or less diagrammatically in the drawing filed herewith, the single figure of which represents a plant utilizing the inventive idea.

The sludge, which is a typical form of material with which this invention is concerned, comes from a filter through which the sewage flows after preliminary treatment. This sludge from the filter is very wet, holding as much as 70 to 85% moisture. In its treatment and preparation for combustion it is first dried and for this purpose is first mixed with a certain proportion of material that has been previously dried. The raw wet sludge is delivered at 1 to the mixer 2 where it is intimately mingled with the dry return. The mixture is discharged into a so-called drying tower 3 through which it falls in the presence of hot gases supplied in a manner described below. Together with these hot gases the sludge is discharged into the mill 4 where it is ground up, the drying continuing during such operation. The gases and ground sludge are discharged from the mill 4 through conduit 5 and forced by fan 6 to collector and separator 7 from whose lower end the sludge passes into the receiver 7a.

A certain proportion of the sludge discharged from the separator 7 into receiver 7a is returned, as mentioned above, to be mixed with the raw sludge in the mixer. This return is carried to mixer 2 by the conveyer 8. The remainder is fed by screw conveyer 9 and duct 10 to burner 13 of furnace 14. In some cases a second mill may be required, and the sludge is delivered by duct 10 to such second pulverizing and drying mill for further grinding and drying and then delivered to the burner.

The hot gas used in drying tower 3 and mill 4 is preferably air which is heated in the air heater 15, the heating medium being hot combustion gases taken off by duct 16 from some point between the furnace outlet and the stack. If desired some gas other than air may be used. The preheater 15 may be of any desired construction which will not mingle the heating medium with the medium to be heated.

In its passage through tower 3 and mill 4 this heated air becomes thoroughly charged with moisture. In accordance with the present system, this moisture is removed and the air recirculated, the air thus circulating in a closed cycle. For this purpose the air, after having the dried sludge separated out of it in separator 7, is taken through duct 17 to a condenser 18, where by any desired means, preferably by cooling water out of contact with the air, the moisture is condensed out and removed. In order to save useful heat in the gases before cooling them in the condenser, and to minimize the amount of cooling water required, the air is preferably passed through a heat exchanger 19 before being delivered to condenser 18. In this heat exchanger 19 it gives up heat to fresh air to be delivered to the furnace through duct 20 for use at the burner or as secondary combustion air.

During the contact of the sludge with the heated air in tower 3, mill 4, duct 5 and separator 7, some gases will be distilled off the sludge. Some of these are condensible and will be eliminated in condenser 18, and others are soluble and will be dissolved in and carried off by the moisture precipitated in the condenser. Others however will neither condense nor dissolve but will continue to circulate with the air. The pressure in this closed circuit will therefore tend to rise and a bleeder vent 21 is provided to relieve the pressure. This bleeder preferably opens into the furnace. If additional fresh air has to be introduced at any time, this may be done through a normally closed inlet 22.

It will be noted that in this system there are two closed interlocked and interacting circuits. One of them is the closed circuit for the air comprising the drying tower 3, mill 4, separator 7, heat exchangers 19 and 15, condenser 18 and the connecting ducts. The other is the closed circuit for the sludge comprising drying tower 3, mill 4, separator 7, collector 7a, conveyor 8 and mixer 2 and the connecting ducts. The two circuits thus have drying tower 2, mill 4, duct 6, and separator 7 in common. During the passage of the two through the common part of the circuits moisture is absorbed by the air and thus transferred out of the one closed circuit to the other, from which it is removed by condensation.

What I claim is:

1. In the art of sludge treatment, a process comprising circulating a body of gas in a closed circuit, heating the gas at one point by means of waste hot gases from a furnace, bringing the heated gas during its circulation through the closed circuit into contact with the sludge thereby evaporating moisture from the sludge, thereafter cooling the gas by means of combustion air on its way to the furnace, condensing the moisture out of the cooled gas, and burning the sludge in the furnace.

2. A system for preparing and burning sludge comprising a furnace, a pulverizer in which the sludge is comminuted in the presence of gas to which it gives up moisture, a separator to which the pulverizer discharges the gas and sludge and in which the two are separated and from which the sludge passes to the furnace, a condenser to which the gas is delivered from the collector and from which it is returned to the pulverizer and which condenses moisture out of the gas, means to heat the gas on its way from the condenser to the pulverizer by means of hot gases on their way from the furnace to the stack, and means to cool the gas on its way from the separator to the condenser by means of combustion air on its way to the furnace.

3. In the art of sludge treatment, a process comprising circulating a body of gas in a closed circuit, heating the gas at one point by means of waste hot gases from a furnace, bringing the heated gas during its circulation through the closed circuit into contact with the sludge thereby evaporating moisture from the sludge, pulverizing the sludge while so evaporating its moisture, thereafter cooling the gas by means of combustion air on its way to the furnace, condensing the moisture out of the cooled gas and burning the sludge in the furnace.

RICHARD F. O'MARA.